United States Patent [19]

Lake

[11] Patent Number: 5,102,185
[45] Date of Patent: Apr. 7, 1992

[54] LOAD BED LIFT-ROOF COVER

[75] Inventor: William H. R. Lake, Lathrup Village, Mich.

[73] Assignee: Trail-R-Van Inc., Lathrup Village, Mich.

[21] Appl. No.: 481,791

[22] Filed: Aug. 16, 1990

Related U.S. Application Data

[63] Continuation-in-part of Ser. No. 216,140, Jul. 7, 1988, abandoned, which is a continuation-in-part of Ser. No. 52,906, May 22, 1987, Pat. No. 4,756,571.

[51] Int. Cl.⁵ ............................ B60P 3/32; B60P 7/02
[52] U.S. Cl. .................................. 296/165; 296/176; 296/26; 296/100
[58] Field of Search .......................... 296/10, 163–165, 296/176, 26, 100

[56] References Cited

U.S. PATENT DOCUMENTS

| D. 250,012 | 10/1978 | Windecker et al. | 296/100 X |
| 3,411,819 | 11/1968 | Tyree et al. | 296/164 |
| 3,508,787 | 4/1970 | Strong et al. | 296/100 |
| 3,704,039 | 11/1972 | Dean | 296/100 |
| 3,762,762 | 10/1973 | Beveridge | 296/100 |
| 3,923,334 | 12/1975 | Key | 296/100 X |
| 3,954,296 | 5/1976 | Patnode | 296/10 |
| 4,533,171 | 8/1985 | Lake | 296/173 |
| 4,626,024 | 12/1986 | Swann | 296/216 |
| 4,756,571 | 7/1988 | Lake | 296/100 |
| 4,828,315 | 5/1989 | Muirhead | 296/10 X |

FOREIGN PATENT DOCUMENTS 0303386 2/1989 European Pat. Off. ............ 296/100

Primary Examiner—Dennis H. Pedder

[57] ABSTRACT

A lift-roof cover 10 for a light truck open load bed 12, comprising a lift-roof structure 15 pivotally attached about a lateral axis A—A to the upper edge 44 of the cover forward wall 18, the forward wall 18 being fixedly mounted to the load bed 12 so that, alternately, secure weatherproof enclosure of the load bed 12 may be provided with the lift-roof structure 15 in a lowered position, or the lift-roof structure 15 may be raised at the rear about the lateral axis A—A, providing improved access to the load bed 12. A preferred embodiment incorporates the use of compression struts 74, 76 to provide lift assist in raising the lift-roof structure 15 and accommodates the application of flexible curtains 146 to provide full enclosure with the lift-roof structure 15 in a raised position, while maintaining commonality with methods of manufacture, handling, shipping and storage employed for high volume production load bed covers of the prior art.

21 Claims, 7 Drawing Sheets

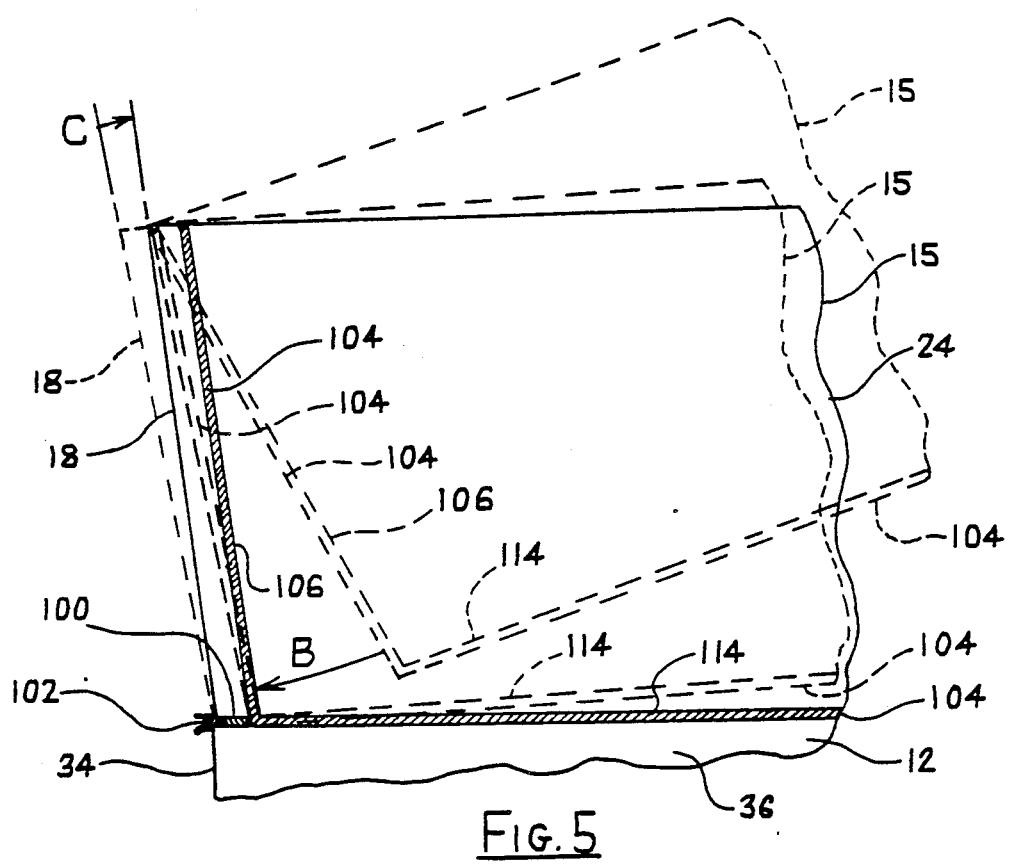
FIG. 5
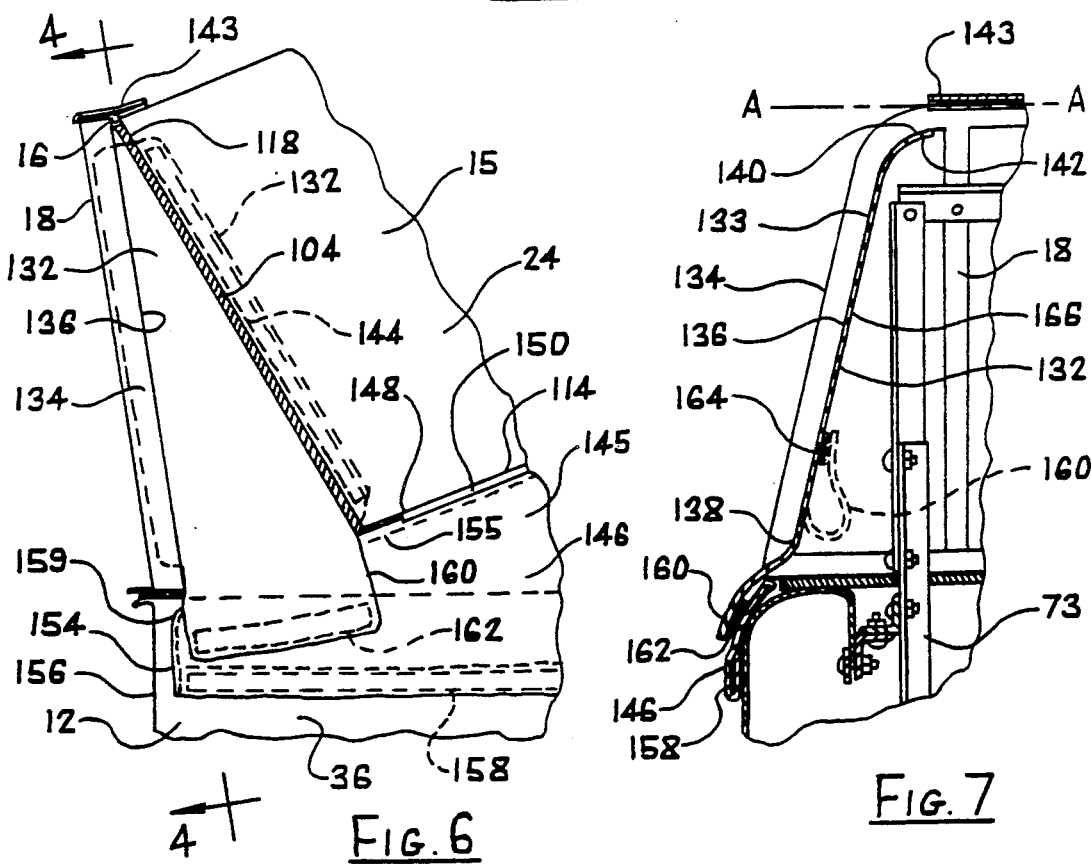
FIG. 6
FIG. 7

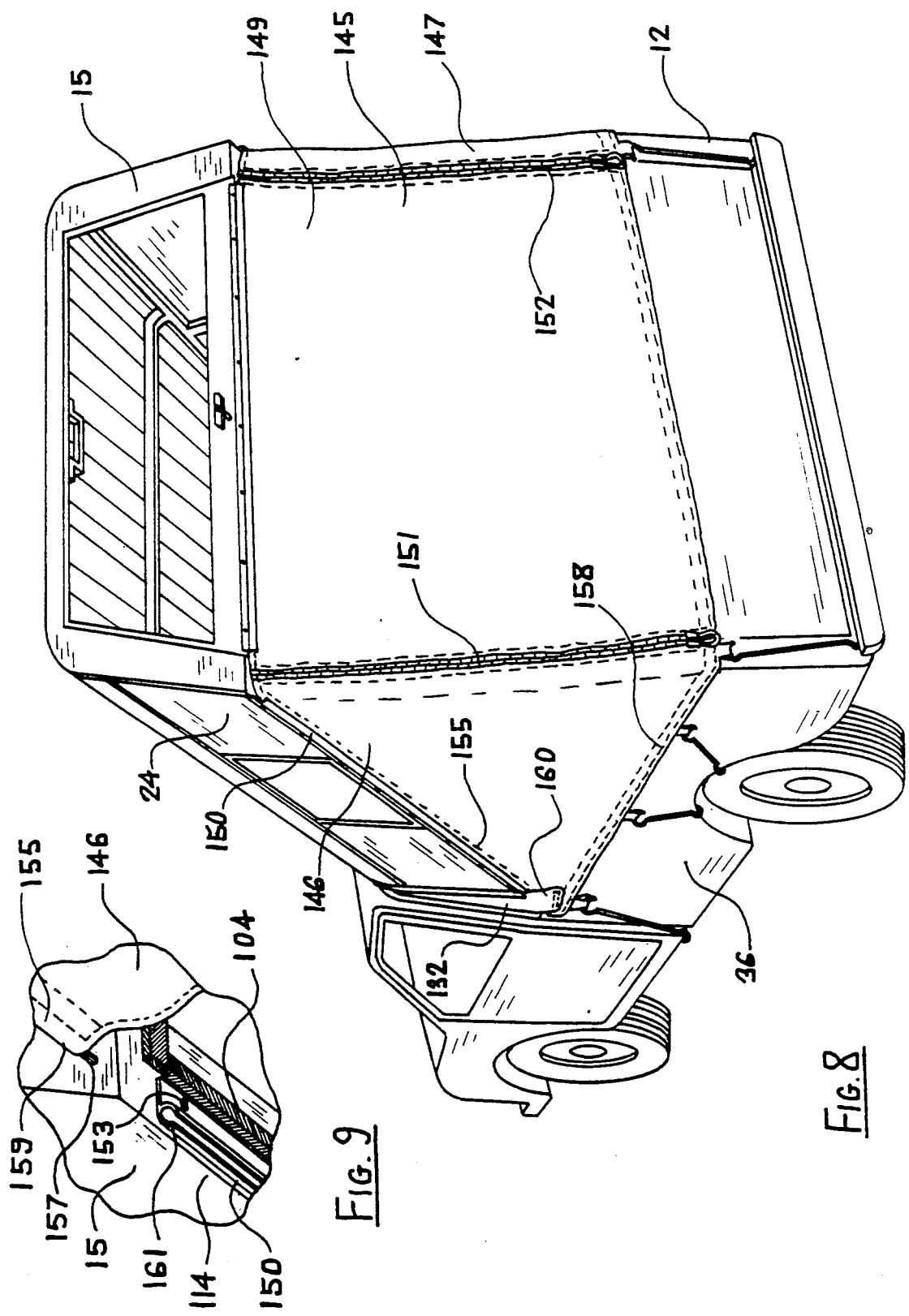

LOAD BED LIFT-ROOF COVER

This application is a continuation-in-part of Ser. No. 216,140 filed July 7, 1988, now abandoned, which was a continuation-in-part of Ser. No. 52,906 filed May 22, 1987 and now issued as U.S. Pat. No. 4,756,571.

BACKGROUND OF THE INVENTION

The present invention pertains to lift-roof covers for use with load beds of light trucks, providing improved access to the load bed and extending vehicle functions to other uses. The invention relates primarily to differences from the parent application which result in providing the desired lift-roof function while 1) maintaining maximal commonality of other benefits with those provided by a conventional fixed mount load bed cover of vehicle cab height and 2) minimizing cost to the user, particularly where the user may be interested in the benefits of weather protection in a raised cover condition, or full enclosure, as for camping use, only as secondary considerations.

Various forms of fixed cover have been manufactured for use with open load bed light trucks. These prior art forms include covers fabricated primarily from molded reinforced plastic or from aluminum. In the majority of designs, these covers present a front view profile which is approximately matched with the front view profile of the passenger compartment or cab, so that maximal volume enclosure is provided relative to the vehicle frontal area and, hence, maximal load volume efficiency relative to fuel economy. The majority of these covers of the prior art are also fixedly attached to the load bed on which they are mounted, except at the rear wall area above the vehicle load bed tailgate. The rear wall usually incorporates an approximately vertical access door, or window, attached at its upper edge to the main structure of the cover by lateral hinging means and equipped with latching and locking means to provide security when closed. Such designs of fixed mount, cab height cover are hereinafter referred to as conventional fixed mount covers.

Primary objectives of load bed cover designs for light trucks include to provide secure, fully enclosed protection for a maximal load volume within capacity constraints for the vehicle and its load bed. Secondary objectives include the provision of convenient access to the cargo area and optimization of vehicle fuel economy and dynamic handling effects due to aerodynamic and weight characteristics of the cover within the constraints of other objectives. However, to some degree, when a fixed mount design is used, a conflict exists between the need for optimal fuel economy with acceptable vehicle handling and the desire for convenient access. This is because any increase in cover height above the passenger cab roof will increase the frontal area, thereby reducing fuel economy due to an associated increase in vehicle aerodynamic drag, as well as adversely affecting vehicle handling due to a raised center of gravity. Therefore, most covers incorporate a roof surface which is aerodynamically blended with that of the passenger cab. With existing conventional fixed mount designs of the prior art, although volume enclosure is near maximal relative to any vehicle fuel economy effects, access is limited to rear entry and this is via an opening which is limited, with respect to fuel economy, by the height of the vehicle passenger cab. This access may be improved with use of a sloping rear door or window and by raising the roof height toward the rear of the cover. However, such designs may compromise fuel economy and/or load volume capacity for a small improvement in access from the rear, with little or no improvement in access from the sides.

Various other types of cover have been marketed which have been designed to provide improved levels of convenience in access to the load bed, while also providing secure load enclosure when required. These include rigid covers pivoted as a single piece about a lateral axis in proximity to the upper edge of the load bed forward wall. With covers of this concept, a low profile above the load bed has been found to be necessary to maintain an acceptable appearance with a shape which avoids interference of the cover with the passenger cab, when in an open position. U.S. Pat. Nos. 3,785,698 (Dean et al), 3,923,334 (Key), 4,079,989 (Robertson) and 4,324,429 (Wilson et al) disclose load bed covers of this general concept. However, whereas such covers fail to provide full cab height over the load floor, U.S. Pat. Nos. 3,512,828 (Craft) and 4,613,181 (Rafi-Zadeh) disclose rigid covers which may be raised from a low profile, closed position to a position providing standing height over the full length of the load bed, with access from either side or from the rear. Nevertheless, in the closed position, as with any low profile cover, a large portion of the load volume is lost relative to a conventional fixed mount cover of cab height.

U.S. Pat. No. 4,221,423 (Stone) discloses a load bed cover of full cab height in which improved access is gained by a roof made up of a plurality of rigid panels hingedly attached one to another, so that a major portion of the roof may be folded clear of the load bed. However, the complexity and cost of manufacture appear prohibitive relative to a fixed roof cover.

U.S. Pat. No. 4,335,916 (Gutgsell) discloses a cover of full cab height, having a rigid lift-roof which is hinged about a lateral axis disposed along the upper horizontal surface of the cover. In an embodiment which is hinged close to the vehicle cab, increased access is afforded to the enclosed space, as by standing on the truck bed. However, this concept appears suitable only for structural fabrication in reinforced plastic, resulting in high weight with high manufacturing complexity and cost.

U.S. Pat. Nos. 4,252,363 (Rodrigue) and 4,639,034 (Amos) disclose load bed covers of full cab height in which flexible weatherproof fabric is stretched over movable rigid support hoops. The hoops and fabric expand or contract in accordion-like manner back and forth along the load bed while secured by sliding retention means at the vehicle load bed left and right walls. However, these concepts have obvious limitations in the levels of security provided, and/or high complexity in methods of manufacture and installation relative to conventional fixed mount covers. Similar access convenience may be provided with improved security by a two-section, rigid wall cover of cab height, in which a rear section may slide forward under a fixed forward section, as described in the March 1984 issue of Popular Science magazine. Again, however, manufacturing cost would appear to be high.

U.S. Pat. No. 4,101,162 (Koehn) discloses a vertically swingable camper shell which is supported by a specially constructed curved track and roller system defining opening motion of the shell with electric winch actuation. This concept appears to facilitate adaptation of a low conventional load bed cover to a lift-roof function, but severely offsets the associated cost advantage with complexity in the opening mechanism.

U.S. Pat. No. 4,756,571 (Lake), which is the parent application for the invention disclosed in this continuation-in-part application, describes a lift-roof cover in which flexible weatherproof panelling is interposed between a cover forward wall and a lift-roof structure in such a way that the lift-roof structure may be pivotally attached to the forward wall about a lateral axis in proximity to its lower edge. This structure accommodates opening of the cover for improved access by raising the lift-roof structure at the rear, and maintains weather protection between the forward wall and the lift-roof structure above the lower edge of the forward wall when in an open condition, due to the full jointing provided by the interposed flexible weatherproof panelling. This structure further facilitates adaptation to full weatherproof enclosure with the lift-roof structure in a raised position for such purposes as camping. However, where the user is concerned more with improved access convenience and less with camping use or optimal weather protection at the forward wall to lift-roof structure joint when in an open condition, said interposed flexible weatherproof panelling represents an unnecessary cost if its use may be avoided. Said interposed flexible weatherproof panelling may also be considered to detract from superior levels of security and a more acceptable appearance afforded by a lift-roof cover which presents a fully non-flexible surface similar to that of a conventional fixed mount cover when in the lowered, closed condition.

SUMMARY OF THE INVENTION

Accordingly, a general object of my invention is to provide an improved lift-roof cover of full cab height which 1) provides advantages of improved access to the vehicle load bed, 2) maintains the efficiency benefits of maximal enclosed load volume feasible within the approximate limits of the front view profile of the passenger cab, 3) provides closed security which is fully equivalent to that provided by conventional cab height fixed mount covers of the prior art and 4) requires minimal deviation from established low cost methods of construction, shipping and handling employed for conventional cab height, fixed mount covers of the prior art.

The improved lift-roof cover differs from a fixed mount design toward its forward end in that the major load enclosing structure of the cover, hereinafter referred to as the lift-roof structure, is pivotally attached about a lateral axis in proximity to the upper edge of the cover forward wall. As installed for use, only the cover forward wall and associated parts are fixedly attached to the vehicle load bed. The outer form and appearance of the cover in a closed condition remain similar to those of a conventional fixed mount cover. However, the rearward end of the lift-roof structure may be raised about said lateral axis to an open condition.

In order to provide secure closure equivalent to that of a conventional fixed mount cover when the lift-roof structure is in a lowered position, inside latching means are provided between the lift-roof structure and the vehicle load bed, with mountings toward the rearward end of the lift-roof structure. Lift assist means are attached between lift-roof structure and the cover forward wall, so that the convenience of an assisted lift is provided when the lift-roof structure is raised to an open position.

In a preferred embodiment, compression strut means are pivotally attached between the lift-roof structure and compression strut means forward pivotal attachments at the cover forward wall. The compression strut means forward pivotal attachments are mounted on a frame constructed and attached to the load bed and to the cover forward wall in a manner whereby an amount of angular of movement of the cover forward wall is accommodated relative to the load bed within material elastic limits beyond elastic deflection resulting from forces due to weight of the lift-roof structure alone, so that seating of sealing means between the lift-roof structure forward edges and the forward wall may occur before seating of sealing means between the lift-roof structure lower edges and the load bed upper surfaces. It will be recognised by one skilled in the art to which the invention pertains that this order of events will generally be necessary in order to achieve complete and satisfactory closure with a cover and compression sealing means of the more commonly manufactured types, when the lift-roof structure is pivotted about an axis in proximity to the upper edge of the forward wall. Upon raising the lift-roof structure to an open condition, unseating of sealing surfaces will occur in reverse order to the order described above for seating. The rearward mounted latching means providing closure of the lift-roof structure will preferably be of an over-center lever type, facilitating pulldown of the lift-roof structure to a fully closed condition.

Where sealing means between the lift-roof structure lower edges and the load bed upper surfaces are employed of a type offering low deflection resistance under relatively high seal contact face displacement and/or a low coefficient of friction in contact with the seating surface, the sequence of seal seating described above for the preferred embodiment will generally be less critical. Where the product of deflection resistance and coefficient of friction at the sealing means contact face between the lift-roof structure lower edges and the load bed upper surfaces remain low under relatively high seal deflections, as possible with use of a more complex seal design, the need to conform with the desired sequence of seal full contact seating provided by the preferred embodiment of the invention may be avoided. This will generally require use of a cover forward wall to load bed mounting frame which is more rigid and closely controllable in orientation relative to the load bed compared to that described for the preferred embodiment, and may result in added assembly complexity, cost and/or weight. However, by also substituting weather sealing means of a type, or in a configuration, at the lift-roof structure to cover forward wall interface providing capability for sealing under significantly varying angular relationships between the cover forward wall and lift-roof cover, the need for close control of the orientation of the cover forward wall may also be avoided.

In the preferred embodiment, the compression strut means may be connected between the cover forward wall and the lift-roof structure via pivotal attachments in a manner alternate to that employed for installed service, so that for shipping or storage of the cover assembly, the fully extended struts may be employed to hold the forward wall in a closed or other desired orientation relative to the lift-roof structure with no component part of the cover assembly projecting significantly below a plane drawn across the lower edges of the lift-roof structure. By this means, a rigid outer form of the cover may be maintained which is similar to that of conventional fixed mount covers of the prior art, thus facilitating handling with use of the same methods and means already employed for such conventional covers.

Like the parent application, the invention lends itself to various adaptations and refinements providing added convenience or specialized uses. Amongst these would be the addition of rigid struts to fixedly support the lift-roof structure in a full or partly open position, as may be desirable for extended periods of use in an open condition. Another is the addition of weatherproof fabric panelling or curtains to provide full enclosure of the load bed with the cover in a raised position, as may be useful for such purposes as camping, although this adaptation will be more complex in the area of the forward wall to lift-roof structure attachment.

In summary, my invention provides a combination of the following advantages relative to fixed mount covers of the prior art, as described for the parent invention:

Provision of access to the load bed from both sides when open;

Provision of improved access to the load bed from the rear;

Capability for travelling with the roof in a raised position, accommodating transportation of cargo which is greater in height than may be transported using a conventional fixed mount cover of the prior art;

Provision of approximately the same load volume enclosure when closed as provided by conventional fixed mount covers of the prior art;

Provision of the same convenience of access with similar protection, vehicle fuel economy and handling when in a closed condition to that afforded by conventional fixed mount covers of the prior art;

Minimization of changes in manufacturing methods which are necessary from those established for low cost conventional fixed mount covers of the prior art;

Avoidance of need for changes in methods of handling, shipping and storage from those employed for conventional fixed mount covers of the prior art;

Vehicle installation procedures which approximate the simplicity of those required for conventional fixed mount covers of the prior art;

Accommodation of removable flexible fabric panelling or curtains to provide enclosure with the roof in a raised position, for such purposes as low cost camping;

Improved accommodation for the use of slide-in camping equipment.

In addition to the above, relative to the lift-roof cover disclosed in the parent application, the invention provides:

Further reduction in cost of manufacture associated with minimization of changes in manufacturing processes from those employed for conventional fixed mount covers of the prior art;

Reduction in stock complexity required for color matching due to avoidance of use of an external flexible panel between the cover forward wall and the lift-roof structure;

Reduced intrusion of the compression strut means system into the cargo area of the load bed;

Improved levels of security in a lowered roof, closed cover condition;

An increased area of shelter from the elements and increased vertical headroom for a given angle of opening in a raised roof, open cover condition.

Further objects and advantages will become readily apparent to those skilled in the art to which the invention pertains upon reference to the following detailed description of a preferred embodiment.

DESCRIPTION OF THE DRAWINGS

The description refers to the accompanying drawings in which reference characters refer to like parts throughout the several views and in which:

FIG. 5 is a fragmentary side view of the forward left side of an improved lift-roof cover, as installed.

FIG. 6 is a fragmentary side view of the forward part of a lift-roof cover installed and in a raised condition with flexible panelling installed to form a full enclosure;

FIG. 7 is a fragmentary sectional view along lines 4—4 of FIG. 6.

FIG. 8 is a perspective view from the rear of a lift-roof cover mounted on a light truck load bed and in a raised condition with a flexible panel enclosure installed;

FIG. 9 is a fragmentary perspective view from the rear showing a method of attachment of a flexible panel to the lift-roof structure;

DETAILED DESCRIPTION OF THE PREFERRED EMBODIMENTS

Figure 1:
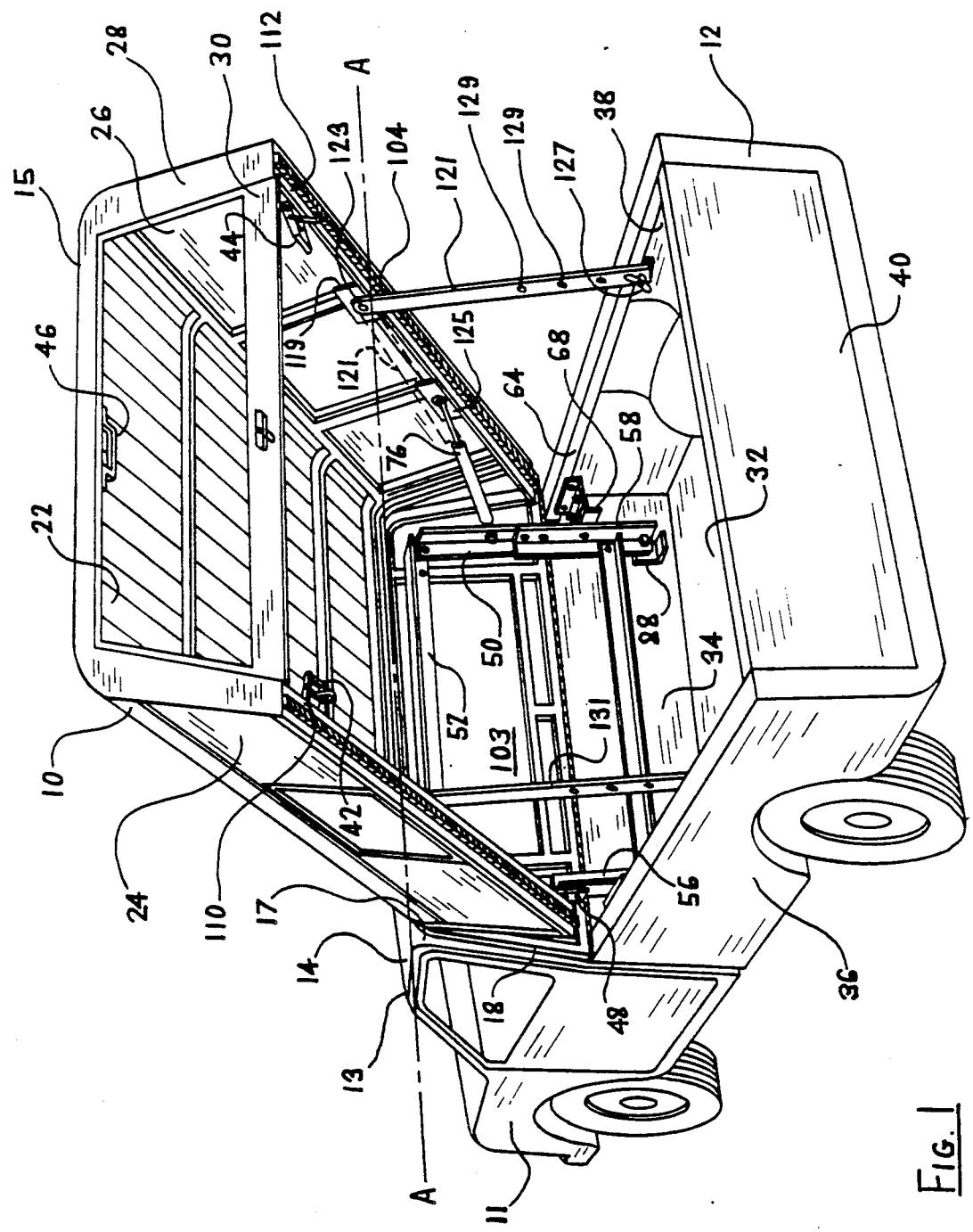
FIG. 1 is a perspective view from the rear of an improved lift-roof cover installed on a light truck load bed and in a raised condition.
Figure 2:
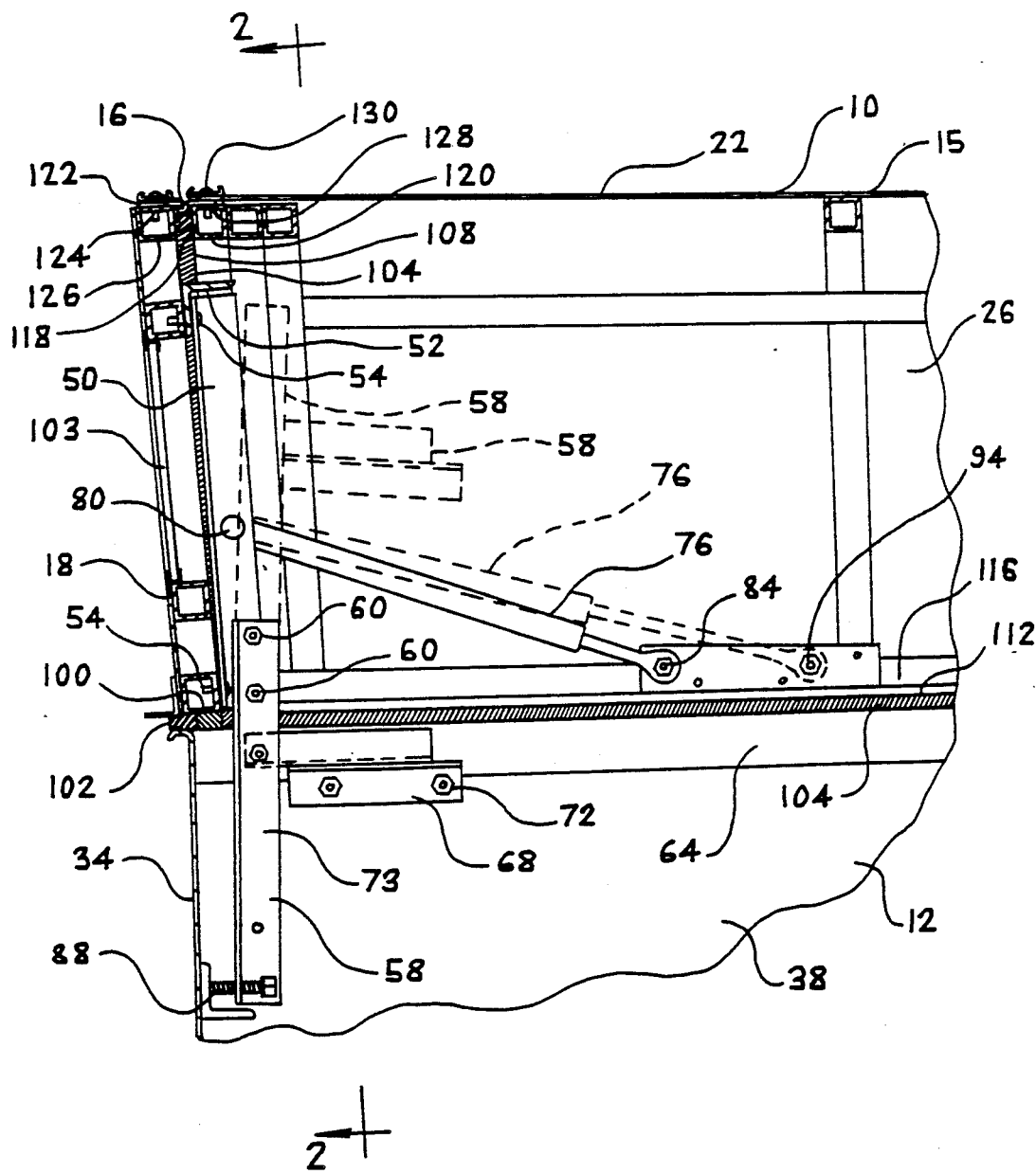
FIG. 2 is a view along lines 1—1 of FIG. 4, showing a right cover wall and mounting arrangement of a right compression strut means.

Referring to FIG. 1 and FIG. 2: the lift-roof cover 10 is mounted on a truck or vehicle 11 having a load bed 12 and passenger compartment or cab 13 incorporating a cab roof 14 and cab rear wall 17; the lift-roof cover 10 comprising a lift-roof structure 15 pivotally attached about a lateral axis A—A by hinging means 16 to a cover forward wall 18 (also referred to herein as a cover forward wall structure); said lift-roof structure 15 comprising a cover roof 22, a cover left wall 24, a cover right wall 26 and a cover rear wall 28, said cover rear wall 28 including a hinged door or window 30; the load bed 12 having a floor 32, a load bed forward wall 34, a load bed left wall 36, a load bed right wall 38 and a load bed tailgate 40.

In use, the cover forward wall 18 is fixedly attached to said vehicle load bed 12. Suitable latching means 42, 44 are mounted at locations toward the rear wall 28 of the lift-roof structure 15, providing secure attachment of said lift-roof structure 15 to the load bed 12 when in a closed condition. A manual lift handle 46 is attached to the lift-roof structure 15 in a location providing an even side-to-side distribution of applied vertical force for opening or closing.

Figure 3:
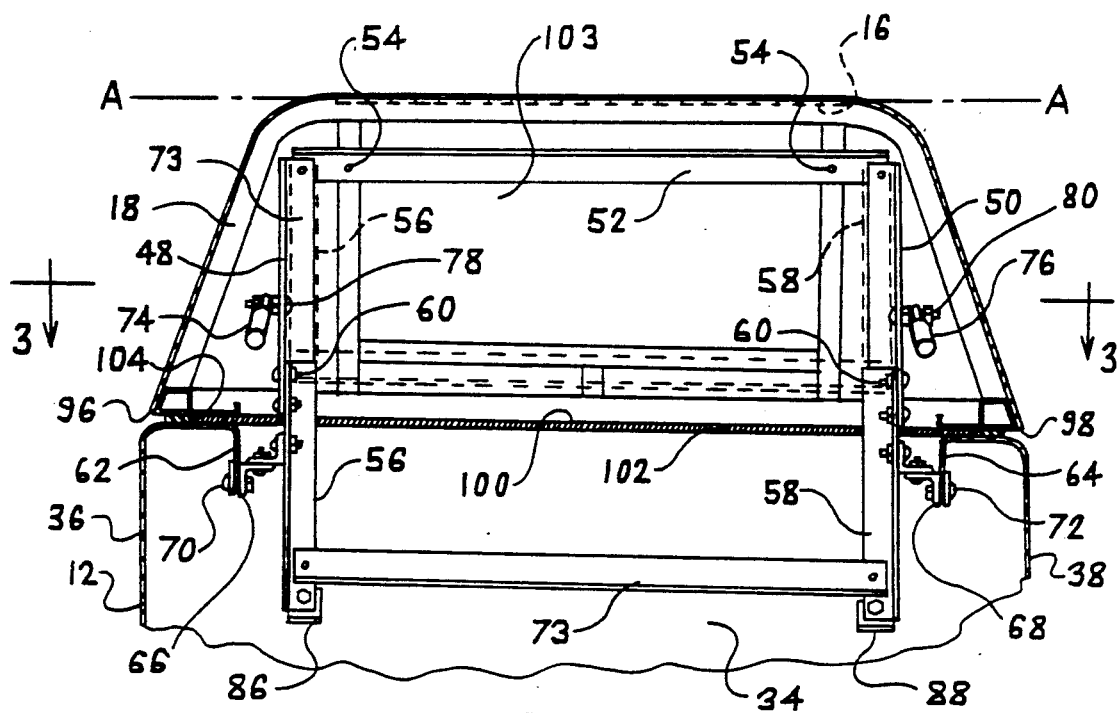
FIG. 3 is a view along lines 2—2 of FIG. 2, showing a lift-roof cover forward wall as mounted to a light truck load bed.
Figure 4:
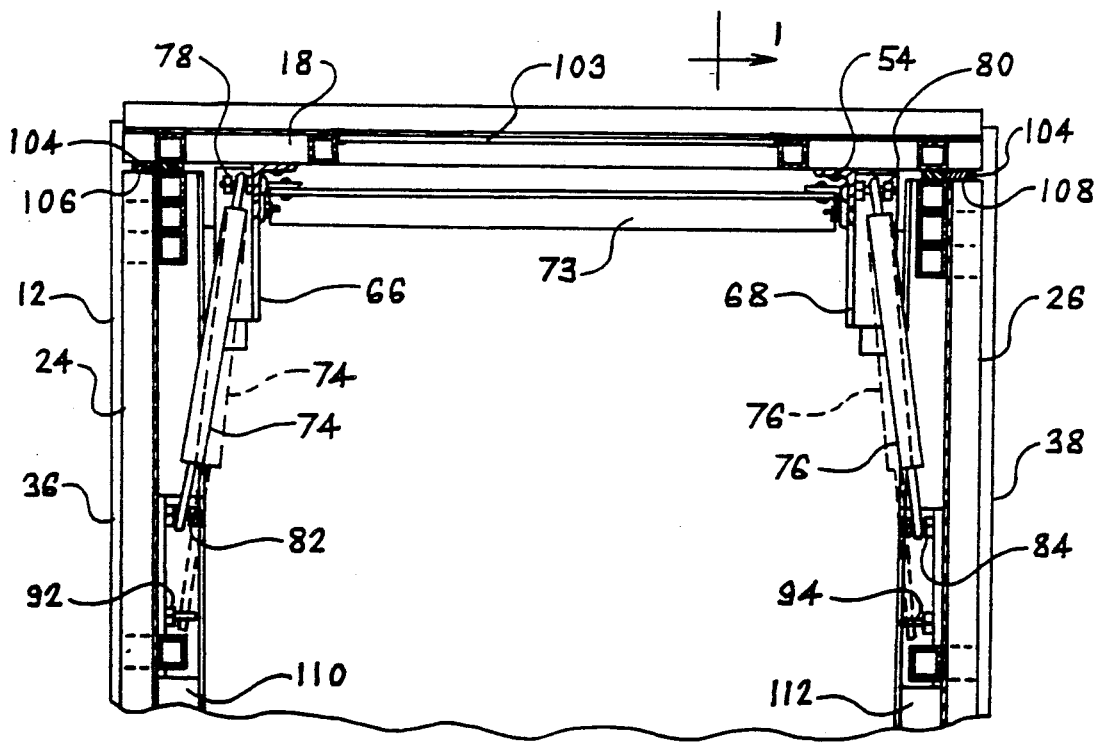
FIG. 4 is a sectional plan view along lines 3—3 of FIG. 3, showing an arrangement of compression strut means pivotal attachments to a lift-roof structure and forward wall.

Referring to FIGS. 2, 3 and 4; structural intermediate members 48, 50, 52 are attached to the cover forward wall 18 by suitable fastening means 54 and provide alternate upper (shown in broken line) and lower attachment positions for left and right structural extension members 56, 58 respectively with use of suitable fastening means 60. When in the lower attachment positions, as necessary for installed service, said structural extension members 56, 58 are attached to the left and right upper inside edges 62, 64 of the vehicle load bed left and right walls 36, 38 via left and right adjusting brackets 66, 68, respectively, and suitable fastening or clamping means 70, 72; said structural extension members 56, 58 in conjunction with structural intermediate members 48, 50, 52 thereby forming a frame 73 which functions to support and locate the forward wall 18 relative to the load bed 12.

Left and right compression strut means 74, 76 are pivotally attached to left and right structural intermediate members 48, 50 via left and right forward pivotal attachments 78, 80; said forward pivotal attachments 78, 80 being located in a geometric relationship with the hinge axis A—A and with suitable left and right compression strut means rearward pivotal attachments 82, 84 at the lift-roof structure 15, such that a desired amount of lift assist effort is provided when the lift-roof structure 15 is raised to an open position. Left and right fore/aft adjusting feet 86, 88, respectively, are attached to said left and right extension members 56, 58 in such a manner as to bear against the load bed forward wall 34; said feet 86, 88 being adjustable so that, in conjunction with adjustment at the left and right upper adjusting brackets 66, 68, satisfactory location and/or orientation of the forward wall 18 may be achieved relative to the lift-roof structure 15 and the load bed 12.

By the application of appropriate locations of common attachment points and lengths for left and right structural intermediate members 48, 50 and for left and right structural extension members 56, 58, said structural extension members 56, 58 may be attached to the structural intermediate members 48, 50 for normal use as shown in solid outline, or may alternately be attached for shipping or storage as shown in broken line with component parts retained above a plane across the lower edges 96, 98 of the lift-roof structure 15. With use of suitably located compression strut means rearward pivotal attachments 92, 94 at the lift-roof structure 15, the compression strut means 74, 76 may function in a fully extended condition, as shown in broken outline in FIG. 2, to hold the cover forward wall 18 in a closed or other desired orientation relative to the lift-roof structure 15, so that the lift-roof cover 10 may assume the rigid outer form of a conventional fixed mount cover of cab height, enabling use of common methods and means for shipping and handling.

Referring to FIGS. 1, 2, 3 and 5; in a preferred embodiment of the invention, the lower edge 100 of the cover forward wall 18 is sealed to the load bed forward wall 34 with sealing means 102, and a window 103 is incorporated into the cover forward wall 18 to provide rearward visibility, as in conventional fixed mount load bed cover designs of the prior art. A sealing means 104 is also interposed between the cover forward wall 18 and the forward edges 106, 108 of the lift-roof structure 15 and between the lift-roof structure left and right walls 24, 26 and the load bed respective left and right walls 36, 38; said sealing means 104 typically being adhesively attached to the left and right horizontal skirts 110, 112, respectively, at the lower edges 114, 116 of the left and right walls 24, 26 and continuing up the forward edges 106, 108 of the lift-roof structure left and right walls 24, 26 and across the forward edge 118 of an integral upper forward lateral member 120 of the lift-roof structure 15.

Referring to FIG. 2; a first leaf 122 of the hinging means 16 is attached by suitable fastening means 124 to an upper lateral member 126 of the cover forward wall 18. A second leaf 128 of the hinging means 16 is attached by suitable fastening means 130 to the upper forward lateral member 120 of the lift-roof structure 15. Spacing is provided between the forward wall upper lateral member 126 and the lift-roof structure upper forward member 120, which spacing is sufficient to allow functional location of compression sealing means 104 therebetween. The forward wall structure 18 is seen to have fore-aft depth at least as great as the thickness of upper lateral member 126.

Referring to FIG. 1; a right pivot support 119 is fixedly attached to the lift-roof structure 15 in a rearward location. A right rigid strut 121 is attached by pivot means 123 to the pivot support 119 so that said right rigid strut 121 may be oriented approximately parallel to and above the horizontal skirt 112 of the cover right wall 26, as shown in broken line, and retained in this position by engagement with a strut retaining means 125, or pivoted downward. A suitable clamping means 127 is provided, which may be attached to the upper edge 64 of the load bed right wall 38 and may also be positively engaged with alternate fastening points 129 along the length of the right rigid strut 121. Fixed support of the lift-roof structure 15 may be provided for a range of orientations between fully lowered and fully raised by use of the right rigid strut 121 in combination with a left rigid strut 131; said left rigid strut 131 being similar to, and mounted in a fashion matching, the method of mounting described for said right rigid strut 121.

Referring to FIGS. 6 and 7; flexible weatherproof panelling 132 may be adhesively attached to an inside surface 133 of a forward wall outer member 134 to form a weatherproof joint 136 with said member 134 inboard of sealing means 104, said joint 136 extending along said inside surface 133 from proximity with a lowest point 138 to proximity with a highest point 140, so that the upper end 142 of said panelling 132 may be vertically overlapped by a weather seal 143 extending horizontally across any opening in proximity to the hinge axis A—A when the lift-roof structure 15 is in a raised condition. By joining the weatherproof panelling 132 to the lift-roof structure 15 in a manner similar to that for attachment to the forward wall 18, or alternatively, by means of intermediate Velcro or similar retaining means 144, weather protection may be achieved between the forward wall 18 and the lift-roof structure 15 when said lift-roof structure 15 is raised at its rear end to an open position.

Referring to FIG. 8; a full enclosure 145 is provided with the lift-roof structure 15 in a raised position by installation of a left flexible panel 146, a right flexible panel 147 and a rear flexible panel 149 between the lift-roof structure 15 and the vehicle load bed 12. Said flexible panels 146, 147 and 149 typically are made from a tent fabric cut and sewn to an appropriate form. The rear panel 149 is attachable to the left panel 146 by means of a left zip joint 151 and to the right panel 147 by means of a right zip joint 152; said left and right zip joints 151, 152 being accessible for operation from either inside or outside of the enclosure 145.

Referring to FIGS. 6, 7 and 9; the left flexible panel 146 is removably attached to the lift-roof structure 15 by means of a retaining rail 150, said rail 150 being attached to the lower edge 114 of the left wall 24 by fastening means 153 outboard of sealing means 104. The upper edge 155 of said left flexible panel 146 is stitched along its length around a rope insert 157, so that said upper edge 155 may be slid at its forward end 159 into engagement with the rearward end 161 of the retaining rail 150, being slid into said retaining rail 150 until fully captured along its length and then extending beyond a forward end 148 of the retaining rail 150 so that a forward part 154 of the panel 146 may extend approximately to the forward edge 156 of the load bed wall 36, being retained to said wall 36 by suitable retaining means 158, such as, for example, magnetic tape. To ensure weather tightness of the enclosure 145 in the vicinity of the cover forward wall 18, an extended lower part 160 of the forward wall to lift-roof structure flexible weatherproof panelling 132 may be overlapped to the outside of, and attached by VELCRO (or similar) hook and loop retaining means 162 to the forward part 154 of the flexible panel 146. The Velcro surface 162 on the extended lower part 160 of the forward wall to lift-roof structure flexible weatherproof panel 132 may be employed to alternately engage a mating Velcro surface 164 on the inside surface 166 of said flexible weatherproof panel 132, as shown in dotted outline in FIG. 7, so that the lower part 160 may be held clear of the load bed 36 when the full enclosure 145 is not being used and may function to assist in drawing the flexible panel 132 toward an inboard direction and clear of possible interference with desired function of the sealing means 104 as said flexible panel 132 collapses upon lowering of the lift-roof structure 15 to a closed position.

Referring to FIGS. 1, 2 and 5; it will be recognised by those who are practised in the art to which the invention pertains that, with use of commonly available compression sealing means 102, 104 in combination with geometry typically defined by the subject matter of this disclosure, special measures will be necessary in order to obtain acceptable closure of the lift roof structure 15 with full seal contact at both the forward edges 106, 108 and the lower edges 114, 116. This is achieved primarily via elasticity designed into the frame structure 73 in combination with adjustments made at the time of installation to a vehicle.

When the cover 10 is installed to a load bed 12, the structural extension members 56, 58 are first securely attached in the lower positions with the lift-roof structure 15 sitting in a desired lowered position with full seal contact on the load bed side walls 36, 38. The compression strut means 74, 76 are then disconnected at the rearward pivotal attachments used for shipping and storage, the lift-roof structure 15 is raised to a fully open position, and the compression strut means 74, 76 are installed to the appropriate rearward pivotal attachments 82, 84 for service. The orientation of the cover forward wall 18 is then adjusted by means of the adjusting feet 86, 88 so that, as the lift-roof structure 15 is lowered about pivot axis A—A through an angle indicated by arrow B against effort of the compression strut means 74, 76, full seal contact is achieved at the forward edges 106, 108 with the cover forward wall 18 prior to full contact along the lower edges 114, 116 with the walls 36, 38. To achieve full contact with the walls 36, 38, the lift-roof cover 15 is then pulled down against elasticity in the forward support frame 73 through a small angle indicated by arrow C, as if pivoting about the lower edge 100 of the cover forward wall 18, by engagement and actuation of the rear mounted latching means 42, 44.

There has been described and illustrated what is considered a preferred embodiment of the invention. However, these specifications shall not be construed as limitations upon the scope of the invention, since it will be understood that many variations may be made by one who is skilled in the art without departing from the scope of the invention as defined by the appended claims. For example, it will be recognised by one skilled in the art to which the invention pertains that, as an alternative to flexible panelling 132, rigid panelling could be mounted to the forward wall in such a way as to provide weather protection which is overlapped by that provided by the lift-roof structure in a raised condition, and yet remain normally hidden from view with the cover in a fully lowered condition. Also, the use of alternate forms and arrangements of sealing means between the cover forward wall, lift-roof structure and the load bed may be expected to avoid need for the specific sequence of sealing contact necessary for the embodiment which has been described.

Figure 10:
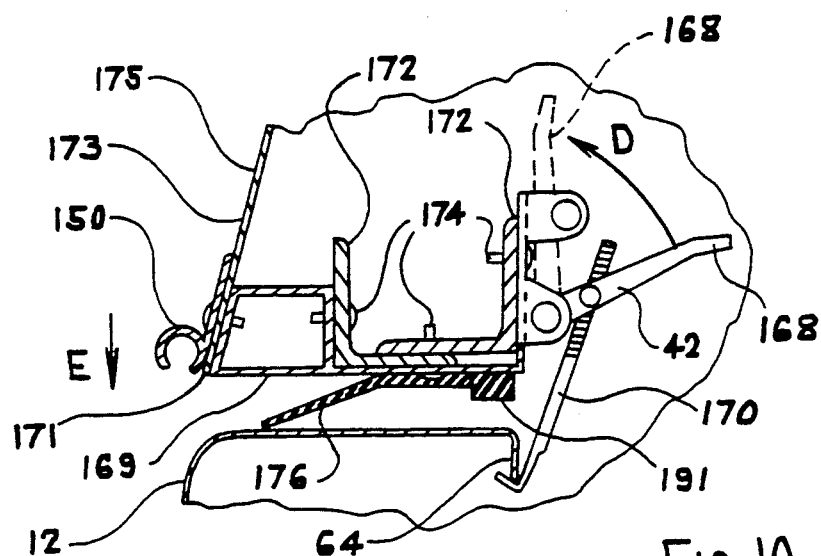
FIG. 10 is a fragmentary sectional view along lines 5—5 of FIG. 12, showing a preferred latching means and alternate sealing means between a lift-roof structure and load bed in a first alternate embodiment of the invention.
Figure 11:
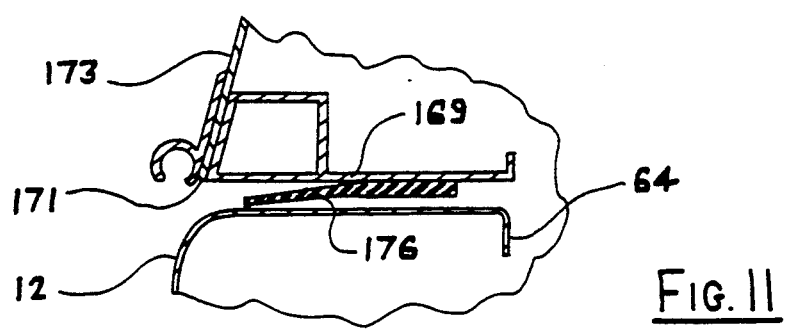
FIG. 11 is a fragmentary sectional view along lines 6—6 of FIG. 12, showing the alternate sealing means of FIG. 10.
Figure 12:
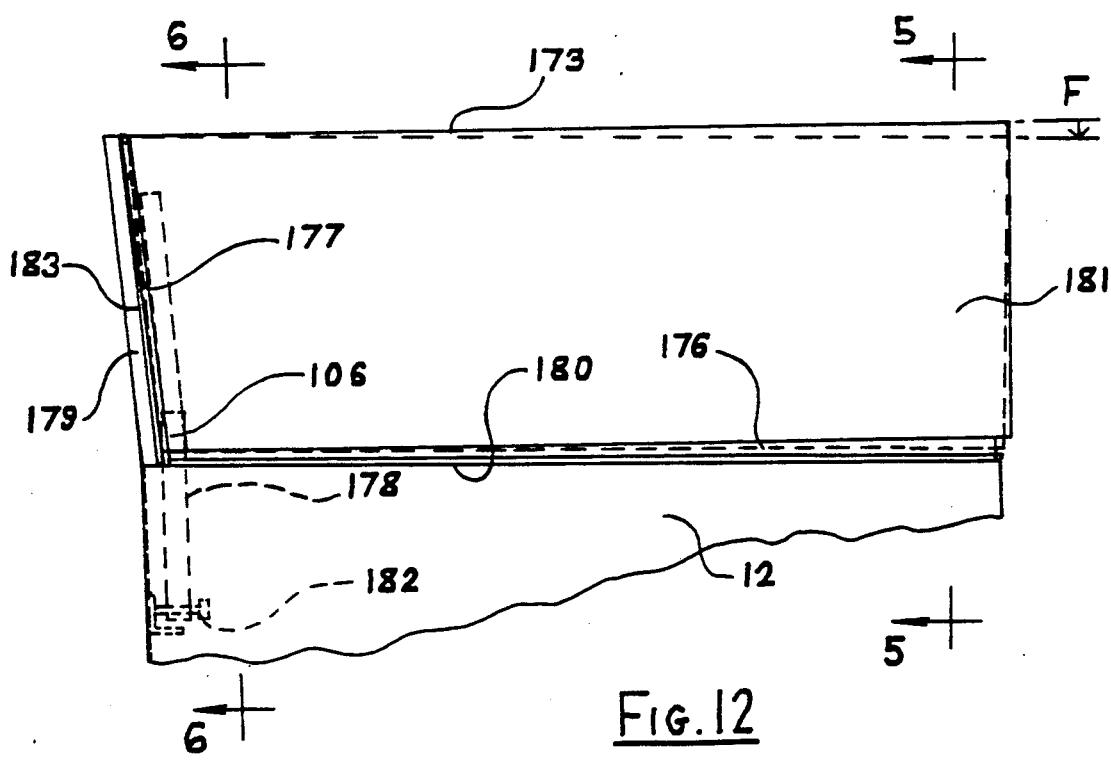
FIG. 12 is a side view showing reversal of the sealing means full contact seating sequence with use of an alternate sealing means in a first alternate embodiment of the invention.

Referring to FIGS. 10, 11 and 12, which illustrate a first alternate embodiment of the invention; a preferred latching means 42 comprises an overcenter pivoting arrangement of lever 168 and screw adjusting load bed engagement means 170 attached via bracketry 172 and suitable fastening means 174 to the horizontal skirt 169 at the lower edge 171 of the lift-roof structure wall 175. Upon engagement of load bed engagement means 170 with the load bed wall upper inside edge 64, the lever 168 is rotated in the direction of arrow D beyond a vertical position, drawing the lift-roof structure 173 toward the load bed 12 in the direction of arrow E until a compression stop means 191 is firmly in contact with the load bed 12. Also shown is an alternate sealing means 176, of a form and material providing low elastic deflection resistance over a large range of vertical displacement, as indicated by the difference in seal displacement at a section drawn through 5—5 versus seal displacement at a section drawn through 6—6, and also providing a low coefficient of friction in contact with the load bed 12 relative to that coefficient of friction resulting from use of more commonly available compression sealing means 177 employed at the cover forward wall 179 (as in the preferred embodiment).

As illustrated in FIG. 12, with use of such an alternate sealing means 176 between the lift-roof structure 181 and load bed 12, and with use of a forward wall mounting frame 178 which is more rigid (than the structural mounting frame 73 of FIG. 2 employed in the preferred embodiment), it is possible, on rotating the lift-roof structure 181 downward toward a fully lowered position, to achieve sliding contact with the load bed 12 along the full length of alternate sealing means 176 prior to completion of seating at the cover forward wall to lift-roof cover sealing means 177, and then to complete seating at said cover forward wall to lift-roof structure sealing means 177 by rotating the lift-roof structure 181 further through a small angle F. The seal seating sequence described for the preferred embodiment may thus be reversed in such a first alternate embodiment, because horizontal frictional resistance at the lift-roof cover to load bed interface 180, remains below levels which would result in sufficient rearward deflection of the cover forward wall 179 to cause a binding condition at said seal interface 180, that would prevent full closure. In such an embodiment, screw adjusting feet 182 or other means of accomodating angular variation are incorporated at the forward wall structural mounting frame 178, because the range of angular variation effectively accomodated by commonly available sealing means 177 at the forward seal interface 181 is small in comparison with variations which may be generated through normal production processes.

Figure 13:
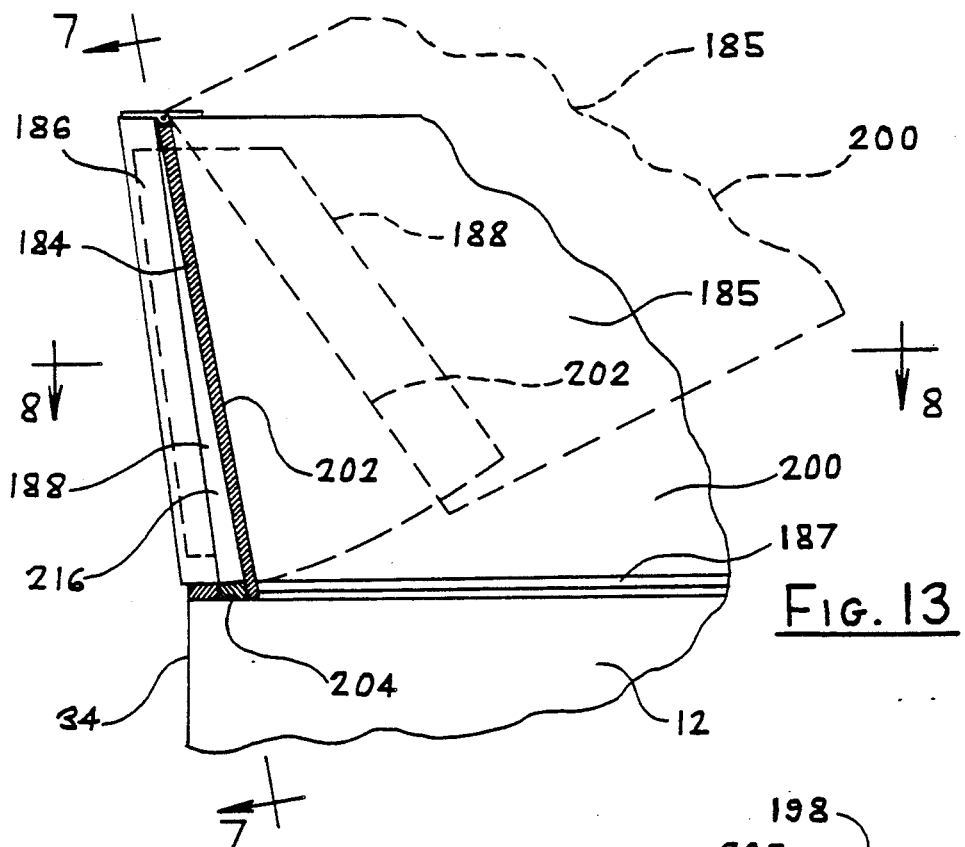
FIG. 13 is a side view showing an alternate arrangement of weather panelling and sealing means between the cover forward wall and lift-roof structure in a second alternate embodiment of the invention.
Figure 14:
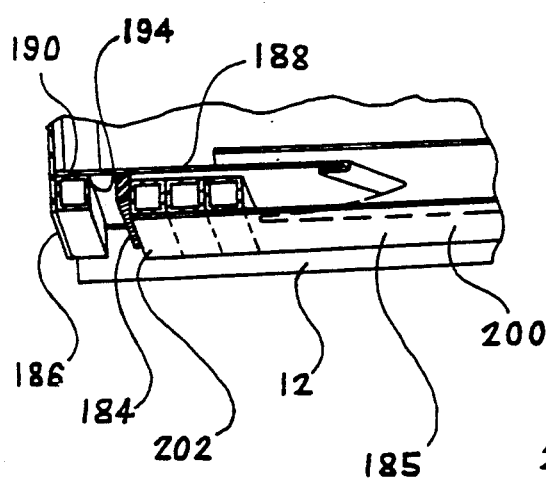
FIG. 14 is a fragmentary sectional view along lines 7—7 of FIG. 13, showing a rigid weather panel mounted to the cover forward wall.
Figure 15:
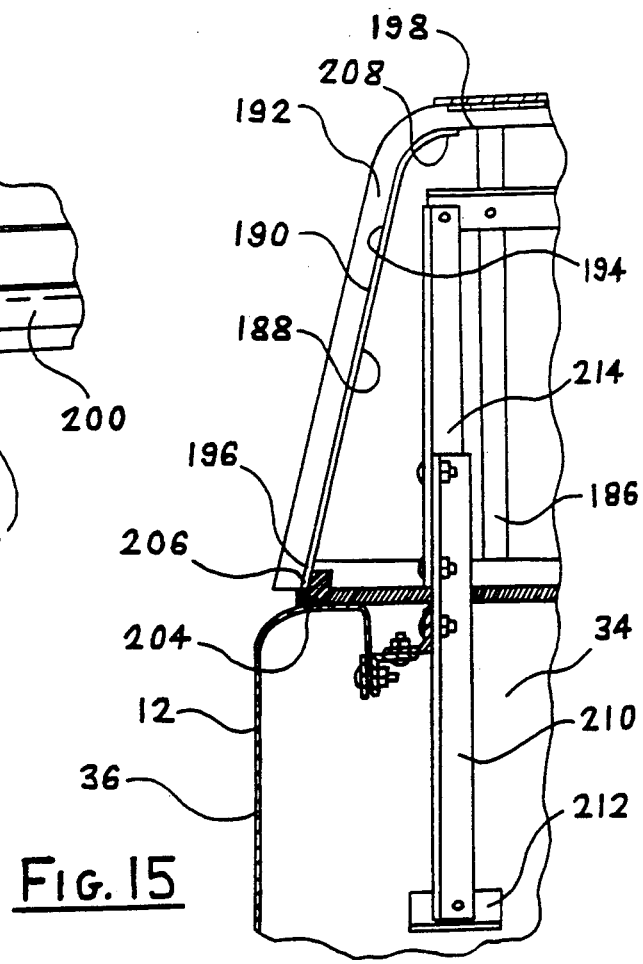
FIG. 15 is a fragmentary sectional plan view along lines 8—8 of FIG. 13, showing sealing means between the lift-roof structure wall forward edge and a weather panel.

Referring to FIGS. 13, 14 and 15, which illustrate a second alternate embodiment of the invention; it will be understood by those skilled in the art to which the invention pertains that, with the use of sealing means 184 between the lift-roof structure 185 and cover forward wall 186, of a type or configuration providing desired weather sealing under a high range of angular displacements of the lift-roof structure 185 relative to the cover forward wall 186, in conjunction with low friction sealing means 187 accomodating high deflection displacements while maintaining contact along its length between the lift-roof structure 185 and the load bed 12, the incorporation of means of adjusting orientation of the cover forward wall 186.

Referring still to FIGS. 13, 14 and 15; rigid panelling 188 is attached to an inside surface 190 of the outer member 192 of the cover forward wall 186 to form a weatherproof joint 194 with said member 192, said joint 194 extending along said inside surface 190 from proximity with a lowest point 196 to proximity with a highest point 198, said rigid panelling 188 extending rearward, inboard of the lift-roof structure wall 200, so as to be overlapped by the forward edge 202 of the lift-roof structure 185 when said lift-roof structure 185 is raised to a fully open position. Sealing means 204 attached at a lower edge 206 of the rigid panelling 188 provides weather sealing between said rigid panelling 188 and the load bed 12. Sealing means 184 is adhesively attached to the forward edge 202 of the lift-roof structure wall 200 in such a manner as to provide a sliding weather sealing function in contact with rigid panelling 188 from the lower edge 206 to an upper edge 208 of said rigid panelling 188. A structural extension member 210 having a non-adjustable foot 212 bearing against the load bed forward wall 34 is incorporated in the forward wall structural mounting frame 214.

Use of a sliding forward seal configuration as described above, incorporating provision for angular clearance 216 to accomodate assembly variations between the cover forward wall 186 and the lift-roof structure forward edge 202 under a fully lowered lift-roof structure condition, provides an alternative means for weather protection in proximity to the cover forward wall 186 with the lift-roof structure 185 in a raised, open condition, and provides weather sealing equivalent to sealing obtained with typical fixed mount covers of the prior art without the need for very close control of orientation of the cover forward wall 186. Because compensation for variability in orientation of the cover forward wall 186 relative to the load bed 12 is provided automatically by the sliding seal configuration, incorporation of means for adjusting orientation of the cover forward wall 186 as described for the preferred embodiment becomes unnecessary for acceptable weather sealing in a fully lowered lift-roof structure condition with the second alternate embodiment.

I claim:

1. For a vehicle having a passenger cab incorporating a cab roof and cab rear wall and having a load bed comprising a floor, a load bed forward wall, a load bed left wall, a load bed right wall and a load bed rear wall with tailgate and tailgate opening: a cover including a cover forward wall attachable to said load bed in such a manner as to extend upward from the load bed forward wall behind the cab rear wall to a height approximating the height of the cab roof; said cover incorporating a lift-roof structure comprising a roof, a cover left wall, a cover right wall and a cover rear wall; said lift-roof structure being pivotally attached to the cover forward wall about a lateral axis in proximity to an upper edge of the cover forward wall, allowing the lift-roof structure to be raised at the rear about said lateral axis from a lower, closed position to a raised, open position; the cover also including means completing seating of the lift-roof structure to the cover forward wall prior to completion of seating of the lift-roof structure to load bed on lowering the lift-roof structure.

2. A cover as described in claim 1 in which panelling provides weather protection between the cover forward wall and the lift-roof structure when said lift-roof structure is in a raised position.

3. A cover as described in claim 1 in which position holding means are employed to provide fixed orientation of the lift-roof structure in a range of positions above a lower, closed position.

4. A cover as described in claim 1 in which position holding means are employed to provide fixed orientation of the lift-roof structure in a range of positions above a lower, closed position; in which panelling provides weather protection between the cover forward wall and the lift-roof structure when said structure is in a raised position; and in which flexible panelling may be attached to the cover left and right walls and rear wall to form a weatherproof enclosure of the load bed with the lift-roof structure in a raised position.

5. A cover as described in claim 1 incorporating lift assist means, so that lift assist is provided in raising the lift-roof structure from a lower to a raised position.

6. A cover as described in claim 1 in which compression strut means are attached between the lift-roof structure and forward pivotal attachments so that lift assist is provided in raising the lift-roof structure from the lower to the raised position, said lift-roof structure having at least one alternate location for the compression strut means attachments such that the cover forward wall may be held in a desired orientation relative to the lift-roof structure.

7. For a vehicle having a passenger cab incorporating a cab roof and cab rear wall, and having a load bed comprising a floor, a load bed forward wall, a load bed left wall, a load bed right wall and a load bed rear wall with tailgate and tailgate opening: a cover providing load bed enclosure and including a cover forward wall structure attachable to said load bed in such a manner as to extend upward from the load bed forward wall behind the cab rear wall to a height approximating the height of the cab roof; said cover incorporating a lift-roof structure comprising a roof, a cover left wall, a cover right wall and a cover rear wall; said lift-roof structure being attached to the cover forward wall structure by means allowing the lift-roof structure to be raised at a rear end and rotated substantially about an upper forward lateral edge from a lower, closed position to a raised, open position; the cover having means for angular orientation of the cover forward wall relative to the load bed to ensure closure of the lift-roof structure left and right walls to both the cover forward wall structure and the load bed on lowering the lift-roof structure from the raised, open position to the lower, closed position.

8. A cover as described in claim 7 in which panelling provides weather protection between the cover forward wall and the lift-roof structure when said lift-roof structure is in the raised position.

9. A cover as described in claim 7 in which position holding means are employed to provide fixed orientation of the lift-roof structure in a range of positions above the lower, closed position.

10. A cover as described in claim 7 in which position holding means are employed to provide fixed orientation of the lift-roof structure in a range of positions above the lower, closed position;
  in which panelling provides weather protection between the cover forward wall and the lift-roof structure when said structure is in the raised position; and
  in which flexible panelling may be attached to the cover left and right walls and rear wall to form a weatherproof enclosure of the load bed with the lift-roof structure in the raised position.

11. A cover as described in claim 7 incorporating lift assist means, so that lift assist is provided in raising the lift-roof structure from the lower to the raised position.

12. For a vehicle having a passenger cab incorporating a cab roof and cab rear wall, and having a load bed comprising a floor, a load bed forward wall, a load bed left wall, a load bed right wall and a load bed rear wall with tailgate and tailgate opening: a cover providing load bed enclosure and including a cover forward wall attachable to said load bed in such a manner as to extend upward from the load bed forward wall behind the cab rear wall to a height approximating the height of the cab roof; said cover incorporating a lift-roof structure comprising a roof, a cover left wall, a cover right wall and a cover rear wall; said lift-roof structure being pivotally attached to the cover forward wall about a lateral axis in proximity to an upper edge of the cover forward wall, allowing the lift-roof structure to be raised at the rear about said lateral axis from a lower, closed position to a raised open position; the cover also including means for adjusting the angular orientation of the cover forward wall relative to the load bed.

13. A cover as described in claim 12 in which rigid panelling provides weather protection between the cover forward wall and the lift-roof structure when said lift-roof structure is in a raised position, the panelling remaining substantially hidden from an external side view when said lift-roof structure is in the closed position.

14. A cover as described in claim 12 in which position holding means are employed to provide fixed orientation of the lift-roof structure in a range of positions above the lower, closed position.

15. A cover as described in claim 12 in which position holding means are employed to provide fixed orientation of the lift-roof structure in a range of positions above the lower, closed position;
  in which panelling provides weather protection between the cover forward wall and the lift-roof structure when said structure is in the raised position; and
  in which flexible panelling may be attached to the cover left and right walls and rear wall to form a weatherproof enclosure of the load bed with the lift-roof structure in the raised position.

16. A cover as described in claim 12 incorporating lift assist means, so that lift assist is provided in raising the lift-roof structure from the lower to the raised position.

17. A cover as described in claim 7 further comprising weather sealing between the lift-roof structure and the cover forward wall and between the lift-roof structure and the load bed on fully lowering the lift-roof structure.

18. A cover as described in claim 17 in which panelling provides weather protection between the cover forward wall and the lift-roof structure when said lift-roof structure is in the raised position.

19. A cover as described in claim 17 in which position holding means are employed to provide fixed orientation of the lift-roof structure in a range of positions above the lower, closed position.

20. A cover as described in claim 17 in which position holding means are employed to provide fixed orientation of the lift-roof structure in a range of positions above the lower, closed position;
  in which panelling provides weather protection between the cover forward wall and the lift-roof structure when said structure is in the raised position; and
  in which flexible panelling may be attached to the cover left and right walls and rear wall to form a weatherproof enclosure of the load bed with the lift-roof structure in the raised position.

21. A cover as described in claim 17 incorporating lift assist means, so that lift assist is provided in raising the lift-roof structure from the lower to the raised position.

* * * * *